Patented Sept. 6, 1938

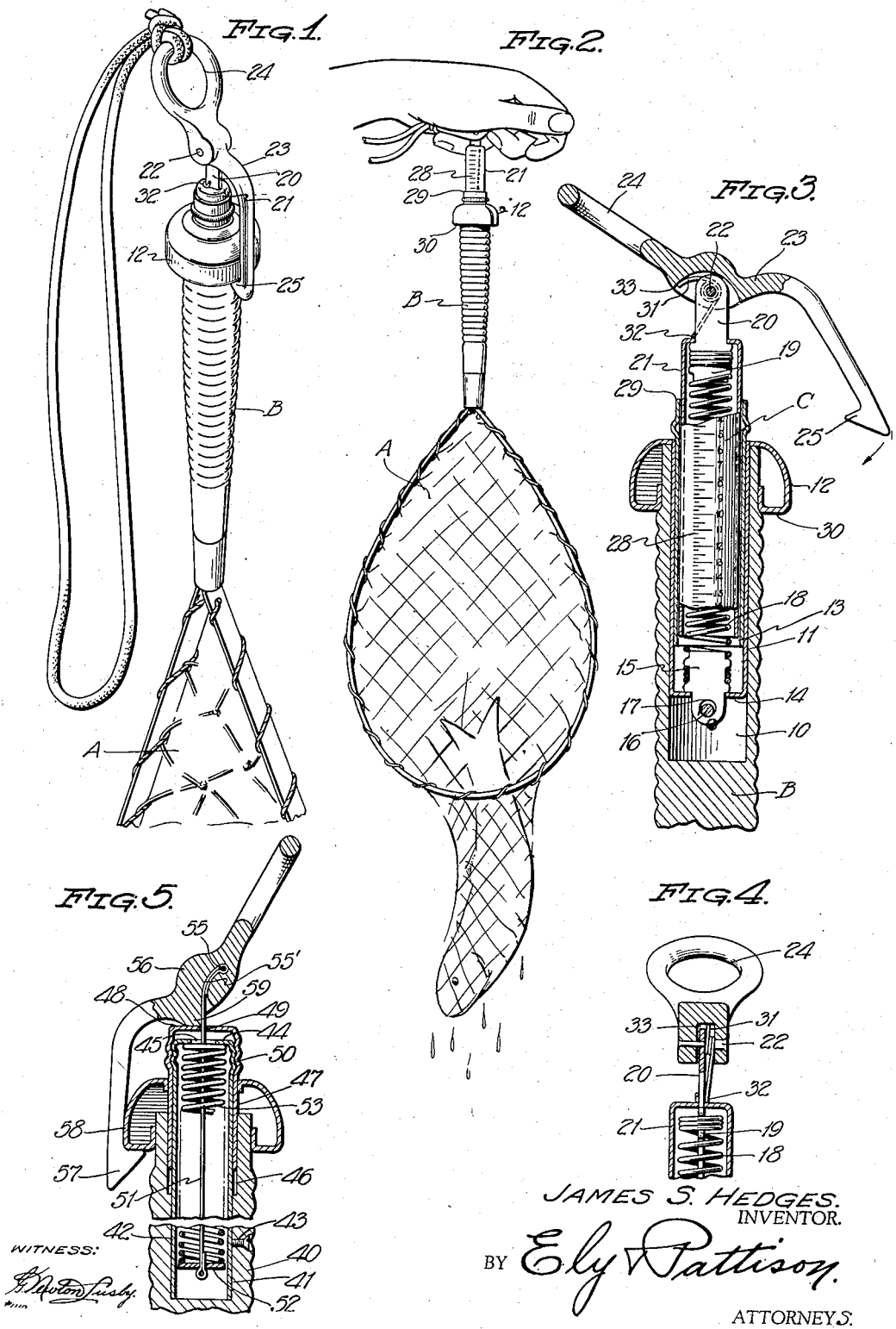

2,129,469

UNITED STATES PATENT OFFICE 2,129,469

WEIGHING DEVICE

James S. Hedges, Rye, N. Y.

Application October 15, 1936, Serial No. 105,760

2 Claims. (Cl. 265—63)

This invention relates to new and useful improvements in fish landing devices such for example as nets, gaffs and the like, and more particularly it pertains to fish landing devices which will permit of weighing a fish immediately it is caught.

Other objects of the invention will appear as the nature thereof is better understood, for which purpose, reference will be had to the following specification and claims and the accompanying drawing.

In the drawing:

Figure 1 is a fragmentary perspective view of a fish landing net constructed in accordance with the present invention, Figure 2 is a perspective view showing the manner in which the device is used, Figure 3 is a detail longitudinal sectional view taken on an enlarged scale, Figure 4 is a detail fragmentary sectional view of a modified form of the invention, and;

Figure 5 is a view similar to Figure 4 taken in a plane at right angles to the plane of Figure 4, said Figure 5 being on an enlarged scale.

Referring to the drawing by reference character and particularly to Figures 1 to 3, inclusive, the reference character A designates the body of a landing net, B designating the handle thereof.

In carrying out the present invention, I preferably provide the handle B with a longitudinally extending recess 10 and in this recess 10 I mount a scale designated C.

In the present instance, the scale comprises a housing 11 for reception within the recess 10, and said housing carries a dome or cap-like member 12. This dome or cap-like member 12 may be a separate element or it may be suitably secured to the housing 11 by electric welding or in any other desired manner.

Mounted within this housing 11 there is a second housing 13 and this second housing 13 has a frictional fit with the housing 11, which will be sufficient to prevent sliding movement of the housing 13 within the housing 11 under ordinary conditions of use. Passing through the bottom wall 14 of the housing 11 there is a lug 15, this lug being held in place in the housing 11 by a cross pin 16 passing through an opening 17 in the lug, the cross pin being disposed exterior of the housing 11. Embracing the lug 15 there is a coil spring 18, the upper end of which embraces a lug 19, which lug 19 has an extension 20. The coil spring 18 is mounted in a housing 21 which in turn is slidably mounted in the housing 13 and the lug 20, heretofore mentioned, projects through a suitable slot or opening in the end wall of said housing 21. Pivotally mounted as at 22 upon the end of the projection 20 there is a lever 23. The lever 23 is pivotally connected between its ends to the extension 20. One end of this lever 23 is formed with a ring or similar opening 24, the other end thereof being formed with a hook 25, the purpose of which will be hereinafter more specifically described.

From the foregoing it will be apparent that in the position shown in Figure 3, any weight which may be present in the body A of the landing net will exert a downward pull upon the handle B, causing the housing 13 to slide upon the housing 21 or in other words, cause the housing 21 to move outwardly of the housing 11. The housing 21 is provided with calibrations 28 which pass in juxtaposition to the edge 29 of the housing 13, and it will be understood that the construction and arrangement of parts is such that the calibration coinciding with the edge 29 of the end of the housing 13 will give a reading of the weight of the article carried in the body A of the net. During the weighing operation, the pivotal lever 23 provides a hand grip by which the entire device may be suspended in the manner illustrated in Figure 2.

In ordinary use as a landing net it is to be understood that the scale, while not necessarily so, is preferably held in an inoperative position, and this is accomplished by engagement of the hooked end 25 of the pivotal lever 23 beneath the shoulder 30 of the cap 12, as illustrated in Figure 1. In order to maintain this engagement between the hook 25 and the shoulder 30, a coil spring 31 passes around the pivotal pin which forms the pivotal point 22 of the lever 23, one end of the spring engaging the end wall of the housing 21 as at 32, the other end engaging the lever 23 as at 33.

As heretofore mentioned, the housing 13 has a friction sliding fit with the housing 11 and it is the purpose of this construction to provide means whereby the housing 13 may be moved or adjusted within the housing 11 to compensate for the weight of a wet net or to make a proper adjustment of the scale should the same become out of adjustment for any reason whatsoever.

In Figures 4 and 5 a slightly modified form of the invention is illustrated and in this form of the invention, the handle 40 of the net is hollowed out as at 41 to receive a tubular housing 42 which is held in position in the handle by a set screw 43. The upper end of the housing is closed as at 44 and provided with an opening 45, preferably circular in form. The hollowed out portion 41 of the handle is enlarged as at 46 and embracing the housing 42 and movable longitudinally of this enlarged portion 46 there is a housing 47. This housing 47 has a closed end 48 which is slotted as at 49. The two housings 42 and 47 are threaded together as at 50 and this construction provides for the adjustment of the housings relative to each other.

The reference numeral 51 designates a tape-like member upon the lower end of which is secured a plate 52. Interposed between this plate 52 and the closed end 44 of the housing 42 there is a coil spring 53. The tape 51 passes through the circular opening 45 in the housing 42 and through the slot 49 in the housing 47, and is secured as at 55 to a pivotal lever 56, the point of securement being between the intermediate ends of the lever. One end of the lever is provided with a hook 57 which is adapted to be engaged beneath a cap-like member 58 similar to the cap 12, heretofore described. The pivoted lever 56 differs slightly in form from the pivoted lever 23, heretofore described, in that it is provided with a nose portion 59 which engages the closed end wall of the housing 47, as best illustrated in Figure 5. This nose portion forms a cam which tends to force the lever outwardly to place the spring 53 under tension to hold the hooked portion 57 in engagement with the cap 58 when the scales are not in use, thus maintaining the scales in their inoperative position and leaving the net free for operation in the usual manner without interference on the part of the scales. It will also be noted that the tape-like member is attached to the pivoted lever 56 in such a manner as to provide a curved or arcuate portion 55' in the tape-like member 51, which construction positions the point 55 of securement out of alinement with the longitudinal axis of the handle. This construction will place the tape under tension, and this tension will be so exerted as to cause the hooked end 57 of the pivoted lever 56 to normally engage beneath the cap-like member 58. When it is desired to use the scales, it is only necessary to rock the lever 56 to the right in Figure 5, whereupon the nose portion 59 will place the spring under sufficient compression to permit of the hooked portion 57 of the lever passing free of the shoulder of the cap 58, whereupon the device is capable of use in the same manner as in the heretofore described form of the invention, the pivoted lever 56 forming the means for suspending the device in operative position as a scale.

As heretofore stated, the two housings 42 and 47 are threaded together as at 50, and this construction provides an adjustment whereby the housing 47 may be adjusted relative to the housing 42 to compensate for any discrepancies in the scales or to compensate for a weighing net. By this construction it will be apparent that the distance from the point 55 of securement of the tape-like member to the shoulder formed on the cap 58 will always be the same regardless of the relative adjustments of the housings 42 and 47, it being understood that the cap 58 is carried by the housing 47, and that, therefore, the lever 56 will always function to retain the scale in inoperative position regardless of the adjustment of the said housings 42 and 47.

From the foregoing it will be apparent that the present invention provides a new and novel construction in fish landing nets whereby a fish may be weighed accurately at the time of its capture, thus obtaining the maximum weight of the fish, since it is a well known fact that fish decrease in weight as the time for which they have been removed from the water increases. Furthermore, it will be obvious that the present invention provides a new and novel construction in which a weighing scale may be incorporated in the handle portion of a fish landing net in such a manner as not to interfere with the ordinary operation of the net when employed in landing a fish.

While the invention has been herein disclosed in its preferred forms, it is to be understood that the invention is not limited to the specific construction herein employed and that it may be practiced in other forms within the scope of the appended claims.

Having thus described the invention, what is claimed as new, is:

1. In a weighing scale, a housing having an open end, a shoulder extending around the housing adjacent the open end thereof, a scale member movable with respect to the housing to perform a weighing operation, and means carried by the movable scale member and having engagement with said shoulder to secure the movable scale member relatively to the housing.

2. In a weighing scale, a housing having an open end, a shoulder extending around the housing adjacent the open end thereof, a scale member movable with respect to the housing to perform a weighing operation, and means carried by the movable scale member and having engagement with said shoulder to secure the movable scale member relatively to the housing, said last mentioned means including a supporting handle carried by the movable scale member and a shoulder engaging hook comprising a rigid angular extension of the supporting handle.

JAMES S. HEDGES.